Figure 1:
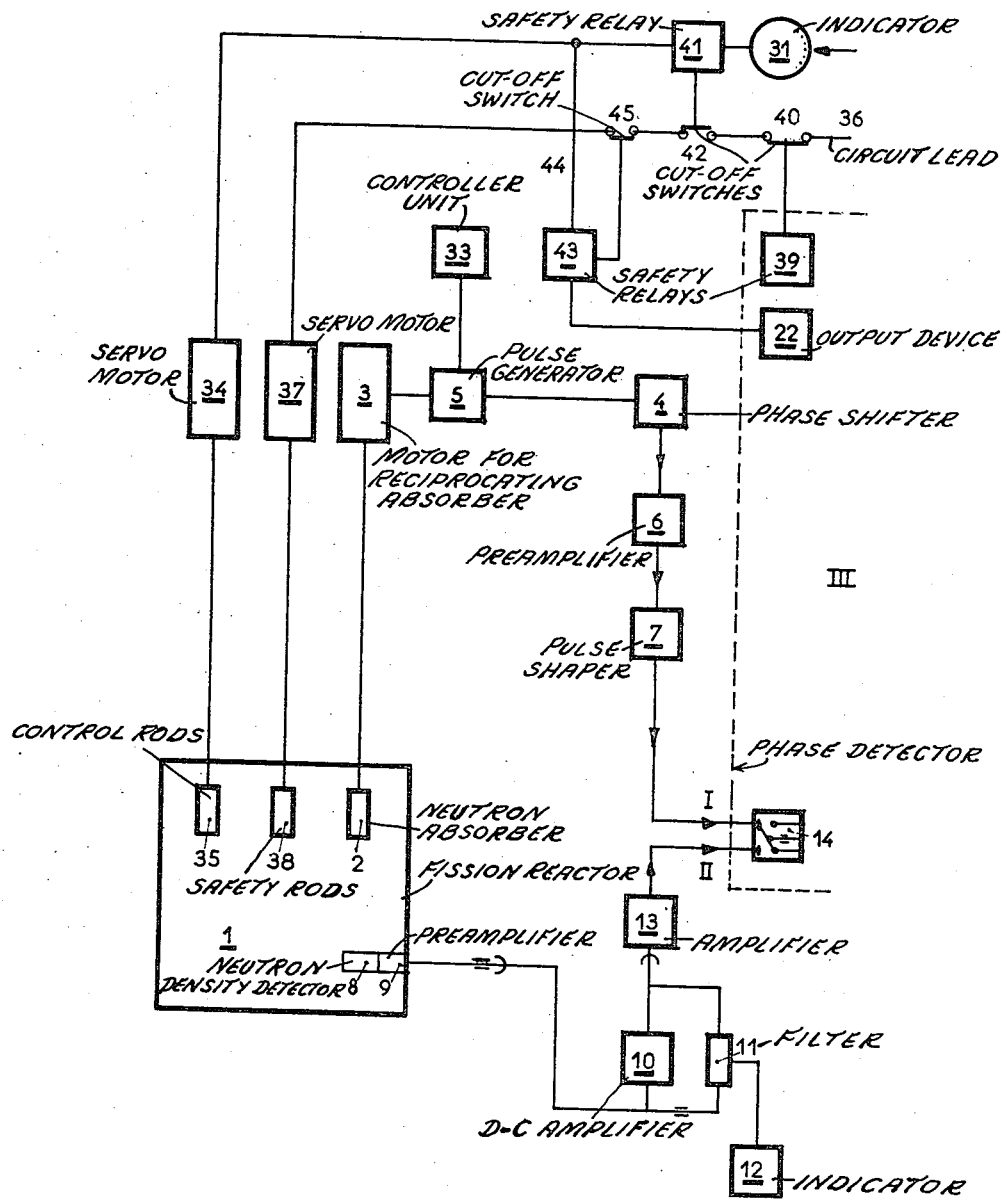

3,079,315
NUCLEAR REACTOR CONTROL
Pierre Marie Le Baud, Petit Clamart, Jean Lacour, Deuil la Barre, and Victor Raievski, Chatenay Malabrye, France, assignors to Commissariat a l'Energie Atomique, Paris, France
Filed May 13, 1958, Ser. No. 734,894
Claims priority, application France May 16, 1957
11 Claims. (Cl. 204—154.2)

This invention relates to systems for measuring and/or controlling the progress of nuclear fission reactions, and especially for measuring or controlling the operation of nuclear reactors used as power generators where the power load is variable, such as atomic power plants for craft and vehicles.

Nuclear reactors forming part of propulsion plants for ships and the like are subject to relatively frequent starting and stopping operations and rapid variations in power output. These requirements together with the stringent safety requirements inherent in all nuclear installations pose difficult problems in regard to control of the progress of the fission reaction therein.

Generally speaking, controlling the operation of a nuclear reactor involves first bringing the reactor to the critical state where the fission chain reaction will be initiated, and thereafter regulating the reactivity of the reactor so as to maintain the energy output thereof at a desired value at all times. Specifically the reactivity should be regulated to the proper positive value for at all times providing the desired power output with the minimum inevitable time lag imposed by thermodynamic and related considerations.

In conventional methods of reactor control the reactivity is generally determined by analog or digital computation. All available data describing the reaction are fed into the computer, including such parameters as temperature effect, xenon effect, effect of absorbers, and lifetime and characteristics of the delayed neutrons. An accurate determination of the reactivity by the computer would require the introduction thereto of such an amount of precise data as to render the method of practically inextricable complexity. Whereas the laws of variation of some of the factors involved are known (such as the life and characteristics of the delayed neutrons, which are constant, and the temperature and xenon effects, so that such factors can be supplied without undue difficulty, a number of other factors entering into the computation are much more difficult or are impossible to determine with accuracy. Thus, the changes in the neutron sources, effect of control rods, especially with regard to the shadow effect, and changes in the flux curves generally, are difficult to predict, while changes due to such causes as any absorbers that may be positioned in experimental irradiation tubes, modifications in fuel composition, and more generally any random variations in reactivty, are completely unpredictable.

Another known method of controlling the reaction is available in the sub-critical state only, and involves the use of a pulsed neutron source for measuring the negative reactivity of the reactor in the subcritical range. However even in the subcritical state the accuracy of measurement decreases with the absolute value of negative reactivity and approaches zero as the critical state is reached, so that this method is inoperative for determination of the critical state itself. Moreover, the intensity of the pulsed source must be high as compared to the intensities of any other sources present in the reactor. This prevents use of this method in reactors using such moderators as heavy water and glucinium after such a reactor has been operated at a high rate, because of the presence of high-intensity residual neutron sources.

It is an object of this invention to provide an improved system for determining the operation of nuclear reactors, and especially variable output reactors of the kind used e.g. as propulsion plants. An object is to provide an automatic system for determining the reactivity of a nuclear reactor throughout the subcritical, critical and supercritical ranges thereof. An object is to provide a method and means of automatically and continuously measuring the reactivity of a reactor. A broad object is to improve the safety, accuracy, flexibility and efficiency of operation of nuclear reactors.

In accordance with one aspect of the invention, a nuclear reactor control system comprises means for cyclically varying the multiplication factor of the reactor, determining the corresponding cyclic variations that occur in neutron density or some other suitable nuclear magnitude characteristic of the reactor so selected that the time lag of a variation in said magnitude in response to a variation in the multiplication factor is a measure of reactivity, and operating the reactor controls in accordance with said time lag. A servo-loop is thus created whereby the reactor may continually be operated in accordance with the error existing at any time between the actual reactivity and a desired reactivity value as determined e.g. by a stored program or otherwise.

The cyclic variations imposed on the multiplication factor of the reactor in accordance with the invention are preferably low-amplitude sinusoidal variations, it being understood that such cyclic variations would usually be superimposed over long-term variations of the multiplication factor. Further, as the characteristic nuclear magnitude, neutron density is preferably used. Analysis and experience both show that the time lag of variations in neutron density over the variations in multiplier factor is to a substantial approximation a function of reactivity only.

The amplitude in the cyclic variations imposed on the multiplier factor should be selected with regard to the sensitivity of the particular measuring or detecting means used; a convenient order of magnitude for the relative amplitude may be indicated as ±20 per hundred thousand.

As to the frequency of the cyclic variations imposed on the multiplier factor, this should be so selected as to provide maximum sensitivity of the response of the neutron density phase condition for given variation in reactivity, while avoiding unstable operation of the reactor and providing a minimum lag or response time. With regard to these various requirements an optimum frequency range has been found to be approximately from 0.5 to 2 c.p.s.

An outstanding advantage of the measuring system of this invention is that the operation of a nuclear reactor is directly monitored by variations in reactivity itself, whether such variations be random or otherwise, while using simple, standard electronic equipment that does not require any modifications in the inner construction of the reactor.

The method of the invention makes it possible to start up rapidly a high-rate reactor after an idle period subsequent to a previous period of high power operation. The rapid increase in reactivity necessary to overcome poisoning by fission products is reliably and safely controlled in a smooth manner, including the transition through the transcritical range. The invention therefore permits the automatic starting of high-output reactors, a feature that is of especial importance in connection with nuclear propulsion power-plants aboard ships, submarines and other types of craft and vehicles.

The new system likewise provides a means of restarting a reactor after its critical state has been rendered indeterminate due to some change in an operating factor, such as a change in the charge and/or composition of the fuel used.

A measuring system according to the present invention generally comprises two main channels. A first channel, herein called the modulating channel, delivers a cyclic, e.g. sinusoidal, signal which is a measure of the variations deliberately induced in the multiplication factor of the reactor by any suitable means, as by slowly reciprocating a suitable neutron-absorbing element into and out of the reactor. A second channel, or detecting channel, delivers a corresponding cyclic signal, generated by a suitable detector device, e.g. an ionizing chamber, measuring the variations in neutron density in the reactor caused by the multiplier factor variations. The signals from the respective channels are applied to a suitable phase detector which delivers an output voltage in the form of a square pulse signal of a frequency equal to the frequency of both signals, and having a pulse width proportional to the phase displacement between the signals in the respective channels. This phase displacement signal may be fed back negatively to a variable phase shifter inserted in the first or modulation channel, thereby tending to reduce to zero the phase detector output signal while simultaneously operating an indicator instrument for indicating the phase shift and hence the reactivity. Moreover a high-precision measurement of the phase shift or reactivity can be obtained by amplitude modulation of the phase detector output signal by a high-frequency carrier wave.

In accordance with a preferred embodiment of the invention, automatic control of the operation of the reactor may be provided (instead of, or preferably in addition to, the measuring and indicating actions just mentioned) by applying to the variable phase shift device just described, a variable, reversible phase shift (lead or lag) as generated by a controller unit, e.g. an automatic program device, while the phase detector output signal is directly applied to operate, through a servo-motor, the controls of the reactor, such as the control rods thereof.

An exemplary embodiment of the invention will now be described for purposes of illustration but not of limitation with reference to the accompanying drawings which are functional block diagrams of a reactor control system in accordance with the invention.

Figure 2:
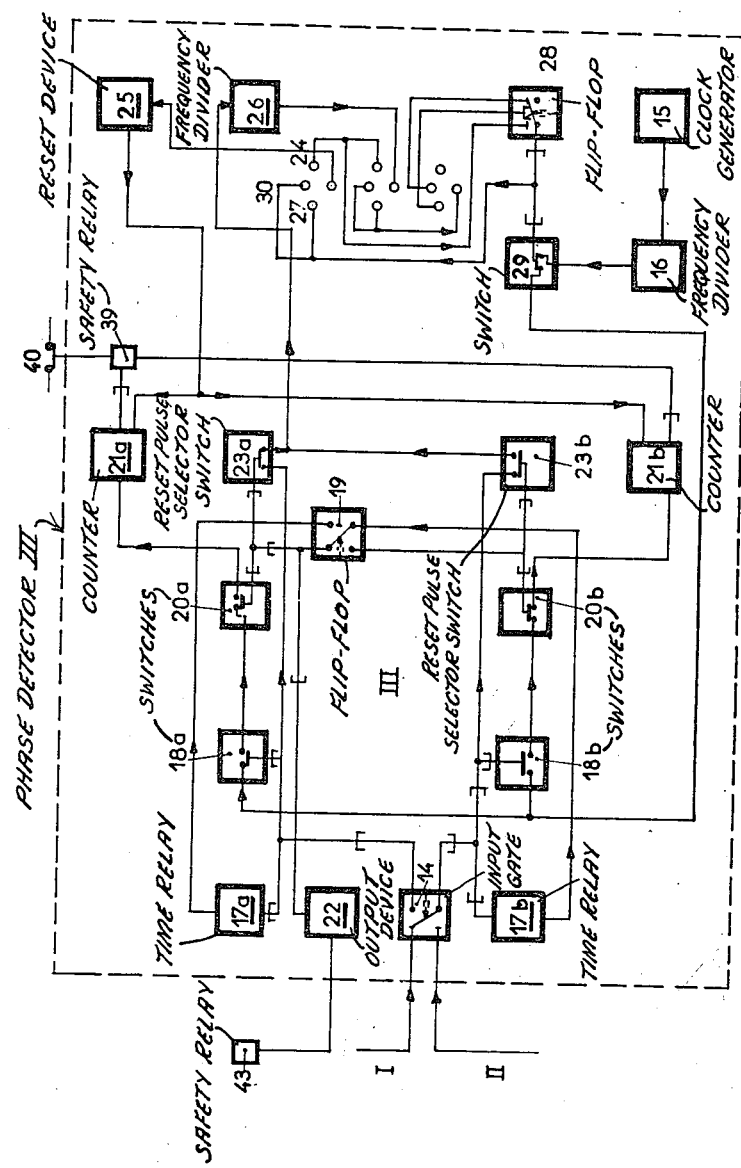
Figure 3:
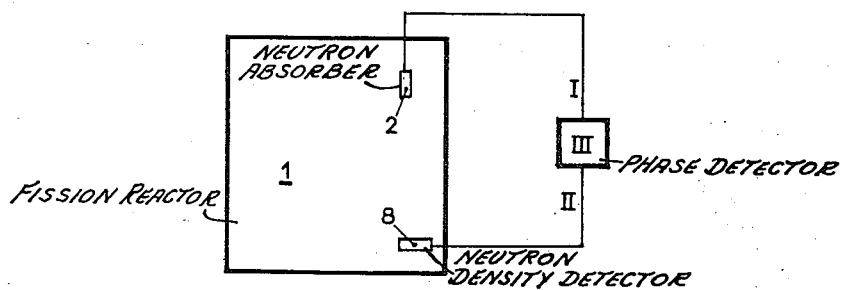
Figure 4:
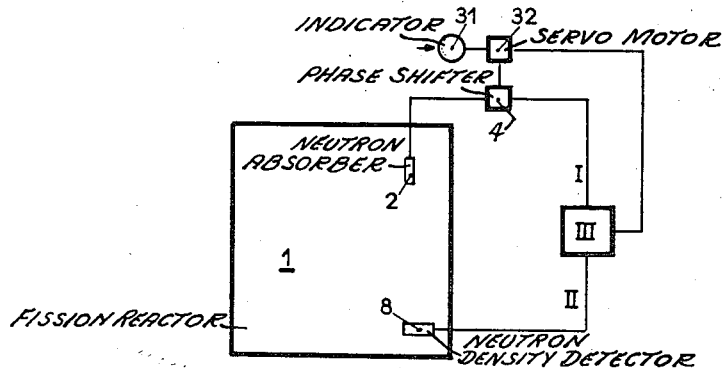
Figure 5:
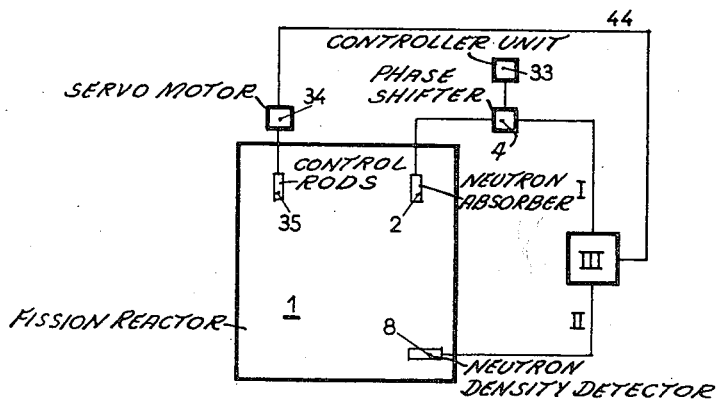

In the drawings:

FIG. 1 schematically illustrates the reactor with part of the control system including the modulating channel I and detecting channel II;

FIG. 2 schematically illustrates the phase detector part of the system;

FIGS. 3, 4 and 5 are simplified diagrams illustrating some basic servo hook-ups in which the control system can be connected for various indicating and control functions according to the invention, FIG. 5 referring to the preferred application of the invention as a means of automatically controlling reactor operation.

Since the various components embodied in the construction of a control system according to the invention are standard devices well-known in the fields of electronic indication, regulation, control and computation, such componets have all been shown merely as functional blocks in the interests of clarity. Corresponding elements are designated by similar reference numerals in all figures.

Referring first to FIG. 1, 1 designates a fission reactor having conventional control rods therein indicated at 35 and safety rods 38. Variable absorption means 2 are provided in the reactor for varying the multiplication factor thereof. The means 2 may comprise for example a neutron absorbing element having a constant total capture cross-section provided with means for mechanically reciprocating it within an area of the reactor where a flux gradient is present; alternatively the variable absorbing means 2 may comprise means for varying the effective neutron capture cross-section of the absorber element in an area of constant flux. The mechanical means for reciprocating the absorber element 2 is indicated as the block 3 which represents a suitable servomotor operated to impart to the absorber element a preferably sinusoidal reciprocatory displacement having a frequency in the range of from 0.5 to 2 c.p.s. and a low relative amplitude of say 10 per hundred thousand. The servomotor 3 simultaneously operates a suitable electromechanical square pulse generator 5 adapted to generate a signal representative of the displacement thereof, which signal therefore represents the variations in the multiplication factor imparted to the reactor. The generator 5 is operated by way of an interposed variable phase shift device 4 the function of which will appear later. The multiplication factor signal from generator 5 is amplified in a pre-amplifier 6 and then passed through a pulse shaper 7. The resulting signal is applied to the first input of a phase detector or comparator system generally designated III. The signal path or channel just described constitutes the modulation channel previously mentioned. The detecting channel previously referred to will now be described.

Means 8 are provided in the reactor for detecting variations in neutron density. The neutron density detecting means 8 may comprise an ionization chamber compensated for rays, and is so positioned within the reactor as to be responsive to a general effect of neutron flux variation rather than to any local density changes due to flux disturbances adjacent the absorber 2 as through shadow effect therefrom.

The neutron density signal put out by ionizing chamber 8 is passed through a preamplifier device 9, and then through a circuit comprising a D.-C. amplifier 10 connected with a filter network 11 for automatically compensating for the D.-C. or long-term variation component of the input signal. The amplifier 10 and compensator network 11 are connected in a feedback circuit such that the output of the circuit, representing the short-term cyclic variations in neutron density as resulting from the induced variations in reactor multiplier factor, appear at the output of said circuit and are applied to an amplifier 13; while the long-term variations in neutron density, which are representative of the reactor power output, appear at the output from compensator network 11, and are shown applied to a suitable indicator instrument 12 for indicating reactor output.

The amplifier 13 is of the zero-level detector type which delivers an output in the form of separate pulses of constant amplitude separated by variable periods of modulation. This output is applied to the second input of the phase detector system III. The phase detector III is thus seen to receive at its respective inputs I and II trains of respective pulses at the same frequency, while the phase displacement between the respective pulse trains represents the time lag elapsing between a variation induced in the multiplier factor of the reactor to the consequent variation in neutron density responsive thereto; thus, said phase displacement or time lag between corresponding input signals I and II is a measure of reactivity of the reactor.

Referring to FIG. 2 an exemplary construction of phase detector unit III will now be described. The input signals I and II are applied to an input element 14 which may comprise a polarized multivibrator or flip-flop circuit adapted to be gated to an "open" condition during the time period separating corresponding pulses of the respective input trains applied to it. The element 14 further receives (through a connection not shown) square clock pulses from a synchronizing or clock generator 15 having a relatively high standard output frequency of say 1000 c.p.s. Thus, the gating circuit 14 puts out intermittent trains of clock signals in numbers corresponding to the time lage or phase displacement between the input signals I and II. These output signals from element 14 are applied to two respective electronic time relay devices 17a and 17b having adjustable time constants for a purpose to appear presently. Said output signals are simultaneously applied to one or the other of a pair of electronic switches 18a and 18b, depending on the sense of the phase displacement between the pulses. It will be understood that phase displacements of either sense are possible owing to the provision of the variable phase shifter 4 as will be made clear later.

Since a 90° ambiguity may exist due to the possible counting of clock signals between a pulse of one input train and the pulse in the other input train immediately ahead of or immediately following it, such uncertainty is removed by the provision of a polarized flip-flop circuit 19. This circuit is adapted to be actuated from either of the time relays 17a or 17b to operate either of two electronic switches 20a or 20b to closed condition. Switches 20a and 20b respectively deliver their output pulses to the respective lead and lag scale counters 21a and 21b, for a purpose to be described.

The polarized flip-flop circuit 19 further supplies its output to an electronic reverser switch 22 constituting the output element of the phase-detector unit, as well as one or the other of two reset pulse selector switches 23a or 23b.

The phase detector assembly thus described may be used according to the invention in a variety of ways. The simplest use is digrammatically indicated in FIG. 3 as providing an indication of the reactivity of the reactor as measured by the phase displacement between the input pulses I and II. For measuring this phase displacement in sense and magnitude the lead and lag scale counters 21a and 21b are used to count the particular number of clock signals from clock generator 15 passed during each cycle of the input signal. Instead of using the relatively high-frequency clock pulses from generator 15, approximate phase displacement indications can conveniently be derived by the use of lower-frequency clock pulses as delivered by a frequency-divider circuit 16 connected thereto.

A three-pole three-throw manual selector switch device is provided for selecting different operating conditions of the control system. As shown, the selector device comprises three ganged switch arms movable to any one of the three positions 24, 27 or 30. With the switch arms positioned on the right-hand contacts 24 the counter system operates continuously. In this condition the counters 21a, 21b are operated through either one of the reset pulse selectors 23a, 23b, frequency divider 26 (similar to divider 16) and the automatic reset device 25, so that the counters are automatically reset to zero on completion of each cycle.

With the selector switch positioned on the left-hand contacts 27 the control system is operated cyclically for a predetermined number of clock signals, then is stopped for the same number of cycles. The scale counters 21a and 21b cooperating with the automatic reset device 25 then indicate the number of clock periods occurring, as displayed on divider 26. A semi-polarized flip-flop circuit 28 thereafter switches an electronic switch 29 to open condition for interrupting the counting process for the same number of cycles, and the counters are then automatically reset. This type of operation yields an accurate phase displacement indication where the repetition frequency is not too high.

For high repetition frequencies, not generally encountered in the normal operation of the control system but useful in specific applications, the selector switch is shifted to the central position shown, into engagement with the contacts 30. This cause the system to operate for a predetermined time after which the system comes to a final stop until such time as the selector switch is moved back to either of its other two positions. Again the phase displacement may be determined by reading the counts indicated by the counters 21a and 21b.

FIG. 4 illustrates the operation of the control system in providing an indication of reactivity by negative feedback operation of the variable phase shifting device 4.

The phase detector output signal from output device 22 (FIG. 2) is applied to a suitable servo-motor 32. The servo-motor is mechanically connected to the variable phase shifting device 4, such as a resolver, through reducer gearing so as to drive the resolver rotor to a position in which the input signal to servo-motor 32 is zero. Motor 32 simultaneously drives an indicator device 31 calibrated in units of reactivity.

FIG. 5 illustrates the preferred use of the control system of the invention in providing automatic control of a nuclear reactor. In this hook-up the phase detector output signal from output element 22 is applied to a servo-motor 34 displacing the control rods 35 into and out of the reactor, while the variable phase shift device 4 may herein be mechanically operated from any suitable controller device 33 such as a stored program unit or the like. It will be noted that in this preferred arrangement a complete servo-loop is provided involving the reactor itself as a component thereof.

Referring back to the more detailed showing of FIG. 1, according to a preferred embodiment of the invention, the phase detector output signal from circuit 22 is applied, by way of a safety relay 43 to both the controller servo 34 and, by way of a further safety relay 41, to a remote indicator instrument 31 which indicates the delay or lag with which the reactor is capable of responding to the reactivity variations as imposed thereon by controller unit 33. Preferably conventional recording means are associated with the indicator 31 for providing a record of such variations.

Safety means are provided for arresting the operation of the reactor in case of a dangerous condition arising in the reactor or defects in the control system thereof. For this purpose the usual safety bars 38 are provided in the reactor, operated by the servo-motor 37. This motor 37 is energized from a power source, not shown, by way of a circuit lead 36. Continued operation of the reactor requires continued energization of safety servo-motor 37 to prevent lowering of the safety rods 38, while deenergization of the motor will allow the safety moderator rods 38 to drop into the reactor thereby arresting the operation thereof. Hence, a plurality of cut-off switches are inserted in series in energizing circuit 36, including as shown the cut-off switches 40, 42 and 45. Cut-off switch 40 is operated by the safety relay 39 arranged to be energized during the continuous type of operation of the control system whenever either of the counters 21a and 21b attains a predetermined maximum count. This maximum count is so predetermined as to correspond in all cases to a reactivity lower than the critical rate for fast neutrons.

A second cut-off switch 42 is arranged to be actuated by relay 41 whenever the response lag of the reactor to the control signal exceeds a predetermined value.

The cut-off switch 45 is actuated by a relay 43 connected so as to be energized by the phase detector output signal from output element 22. Since an output signal of one polarity or the other must always be present during normal operation of the control system, a deenergization of safety relay 43 indicates a defective condition in the control system and this acts to actuate cut-off switch 45 to open condition, shutting down the reactor. It is noted that should the output signal from element 22 persist continuously with the same polarity, thereby indicating another kind of defective condition in the control system tending to vary the reactivity always in the same sense, one of the safety relays 39 and 41 previously mentioned would be operated to shut down the reactor, on the reactivity attaining a predetermined safety level as previously described.

It will be evident therefore that the invention provides a control system for nuclear reactors which permits efficient, accurate flexible, reliable and safe operation of the reactor eminently suitable for control of a nuclear power plant.

What we claim is:

1. In combination with a nuclear reactor having means for performing a fission reaction and auxiliary means for controlling the multiplication factor of said reaction, a reactivity measuring system comprising, means for operating said auxiliary means to impart small-amplitude cyclic variations to said factor, further means responsive to the neutron density in the reactor for detecting cyclic variations in said density resulting from said variations in multiplication factor, means responsive to said controlling means for producing a first cyclically variable electric signal indicative of said multiplication factor variations, means responsive to said further means for producing a second cyclically variable electric signal indicative to said neutron density variations, and phase comparator means connected to receive both of said electric signals for delivering an output indicative of the phase displacement between said cyclically varying electric signals, said output being a measure of the reactivity of the reactor.

2. In combination with a nuclear reactor having means for performing a fission reaction, a reactivity measuring system comprising variable neutron absorbing means operable for varying the multiplication factor of said reaction, means for operating said absorbing means to impart low-amplitude generally sinusoidal variations to said factor, ionizable means in the reactor exposed to neutron flux for detecting cyclic variations in said flux resulting from said factor variations, means respectively, actuated by said operating means in said ionizable means for generating first and second generally sinusoidal signals respectively, phase detector means connected to receive both said signals for delivering an output corresponding to the phase displacement therebetween, said output being a measure of the reactivity of said reactor.

3. In combination with a nuclear reactor having means for performing a fission reaction, auxiliary means in the reactor operable to vary the neutron-multiplication factor of the reaction, means responsive to neutron density in the reactor for detecting a variation therein resulting from a variation in said factor, means respectively connected with said auxiliary means and with said means responsive to neutron density for producing first and second generally sinusoidal signals, respectively, means converting said first and second signals into first and second trains of rectangular pulses of constant amplitude and variable duration, time comparator means connected to receive said pulses and to deliver an output corresponding to the time lapse between corresponding pulses of said first and second trains, whereby said output is a measure of the response time of a variation in neutron density to a variation in said factor and hence a measure of the reactor's reactivity.

4. In combination with a nuclear reactor having means for performing a fission reaction, means for controlling the neutron multiplication factor of the reaction and operable to impart low-amplitude cyclic variations to said factor and to produce a first signal corresponding to said factor variations, means responsive to neutron density in the reactor for producing a second signal corresponding to variations in said neutron density, said second signal being of similar frequency to but phase-displaced relative to said first signal, a variable phase shift device for shifting the phase of said first signal, phase detector means connected to receive said second signal and the phase shifted first signal to deliver an output corresponding to the phase displacement therebetween, and means operated by said output and operating said variable phase shift device in a sense to reduce said output to zero, whereby the operation of said last means is a measure of the reactivity of the reactor.

5. The combination claimed in claim 1, wherein said auxiliary means comprise an absorber element having a constant neutron capture cross-section, said means for operating said auxiliary means comprising means for cyclically displacing said elment to vary the neutron flux therethrough and thereby vary said multiplication factor.

6. The combination claimed in claim 1, wherein said auxiliary means comprise an absorber elment having a variable effective neutron capture cross section, said means for operating said auxiliary means comprising means for cyclically varying said effective cross section to vary said multiplication factor.

7. The combination claimed in claim 1, wherein said cyclic variations are within a frequency range of about from 0.5 c.p.s. to 2 c.p.s.

8. In the combination claimed in claim 1, filter means connected in the path of said second signal for separating short-term variation components from the long-term variation components of said signal, means for applying said short-term components to said comparator means, and means for indicating said long-term components as a measure of reactor output.

9. The combination claimed in claim 3, wherein said comparator means comprise means for generating clock signals at a frequency substantially higher than the frequency of said cyclic variations, gating means connected to receive said clock signals and said first and second pulses and for passing said clock signals to a gate output only during said time lapse between corresponding first and second pulses, counter means for counting said gated clock signals, and means for resetting said counter means responsive to completion of a cycle of said cyclic variation.

10. The combination claimed in claim 1 wherein said means operating said auxiliary means produces cyclic variations of said factor having a maximum relative amplitude of 20 per one hundred thousand.

11. The method of measuring the reactivity of a self-sustaining nuclear reaction in a reactor, comprising the steps of; inducing a predetermined variation in the multiplication factor of the self-sustaining reaction at one position in said reactor, detecting a subsequent variation, at another position in said reactor, in the reaction resulting from said variation in the multiplication factor, and detecting the time lapse between said variation in the reaction and the corresponding variation in the multiplication factor as the measure of said reactivity.

References Cited in the file of this patent

UNITED STATES PATENTS 2,991,364    Goodman _____ July 4, 1961

FOREIGN PATENTS 724,441    Great Britain _____ Feb. 23, 1955

OTHER REFERENCES

Physical Review, vol. 74 (1948), pp. 851, 852, 864–867 and 1217.

MDDC–1664, The Clinton Pile Oscillator, by Hoover et al. USAEC document declassified Jan. 26, 1948, pp. 1–8.

AECD–2044, Theory of Oscillating Absorber in a Chain Reactor, by Weinberg. USAEC document declassified June 7, 1948, pp. 1 and 2.

Atomics, vol. 2. (Feb. 1951), pp. 55–56.

Principles of Nuclear Reactor Engineering, Glasstone, D. Van Nostrand Co., New York, 1st ed., July 1955, pp. 354–356.